United States Patent [19]

Ishihara et al.

[11] Patent Number: 5,176,967
[45] Date of Patent: Jan. 5, 1993

[54] SOLID OXIDE FUEL CELLS

[75] Inventors: Takeshi Ishihara; Hidenobu Misawa, both of Toyoake, Japan

[73] Assignee: NGK Insulators, Ltd., Japan

[21] Appl. No.: 651,972

[22] Filed: Feb. 7, 1991

[30] Foreign Application Priority Data

Feb. 15, 1990 [JP] Japan .................................. 2-32384

[51] Int. Cl.⁵ .............................................. H01M 8/10
[52] U.S. Cl. ........................................ 429/31; 429/30; 429/32
[58] Field of Search ............................. 429/30, 31, 32

[56] References Cited

U.S. PATENT DOCUMENTS

| 3,460,991 | 8/1969 | White, Jr. ........................ 429/30 |
| 4,751,152 | 6/1988 | Zymboly ......................... 429/31 |
| 4,827,606 | 5/1989 | Szreders et al. ................. 429/31 |

FOREIGN PATENT DOCUMENTS

| 0055011 | 6/1982 | European Pat. Off. . |
| 0055016 | 6/1982 | European Pat. Off. . |
| 0242201 | 10/1987 | European Pat. Off. . |
| 0286360 | 10/1988 | European Pat. Off. . |
| 0376579 | 7/1990 | European Pat. Off. . |

Primary Examiner—Shrive Beck
Assistant Examiner—Willie J. Thompson
Attorney, Agent, or Firm—Parkhurst, Wendel & Rossi

[57] ABSTRACT

A solid oxide fuel cell including a closed cylindrical solid oxide fuel cell body including a solid electrolyte, an air electrode and a fuel electrode, a gas supply tube for supplying an oxidizing gas or a fuel gas, partition members arranged between the fuel cell body and the gas supply tube for dividing the hollow space into a plurality of gas flowing passages, a sealing member, at least one exhaust port formed in each of the gas flowing passages, and a support means for holding the opening end side of the fuel cell body.

8 Claims, 4 Drawing Sheets

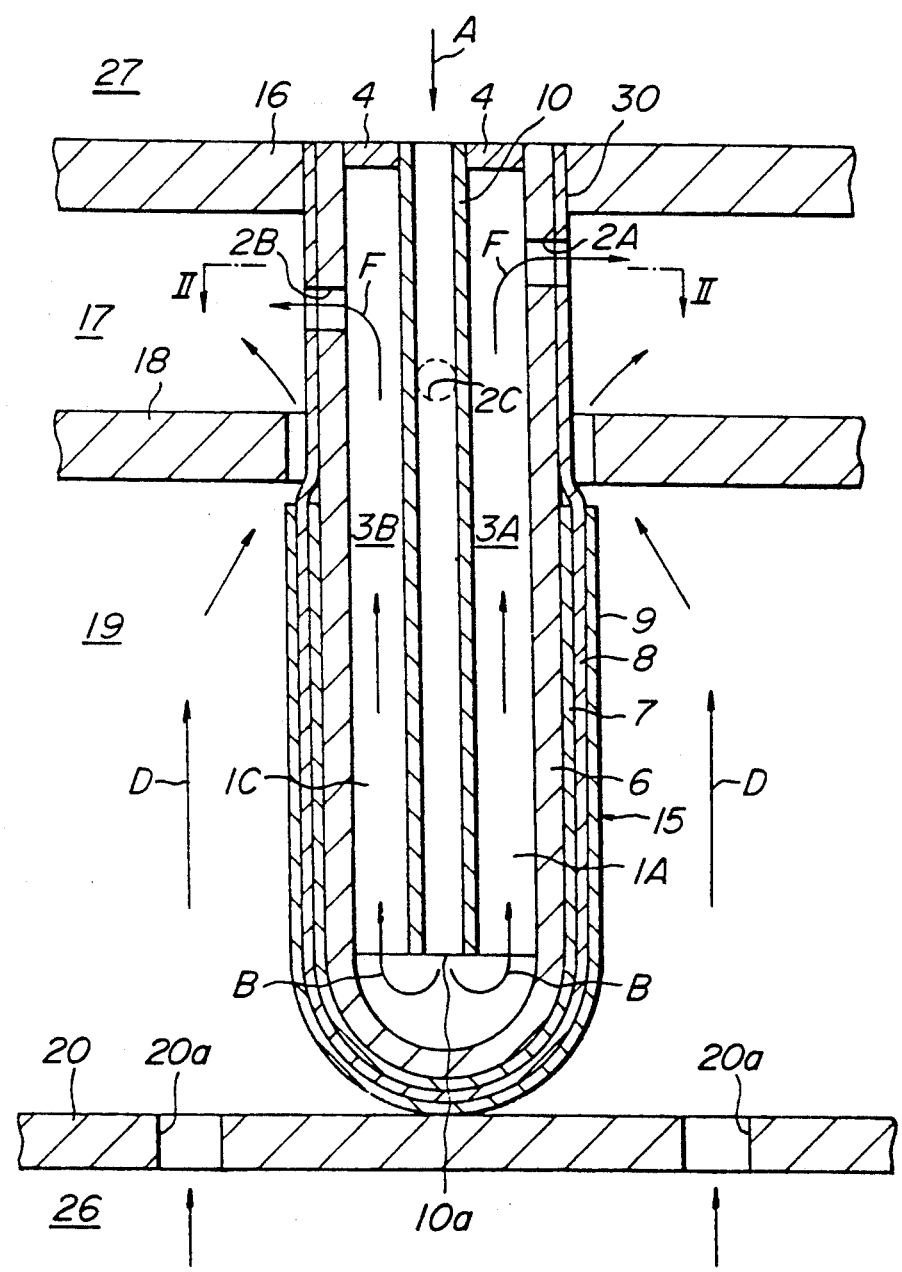
FIG_1

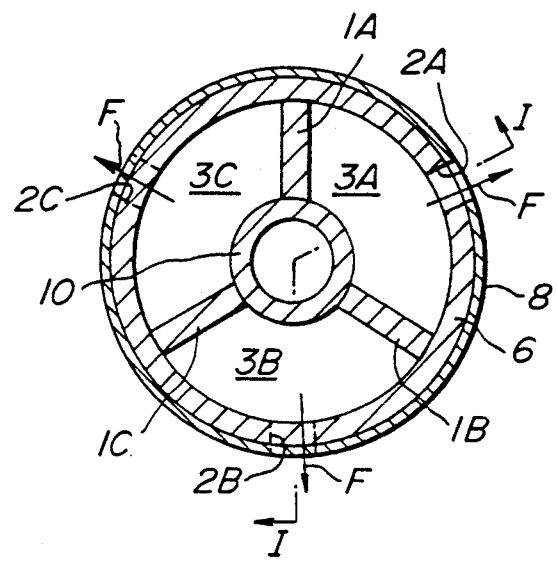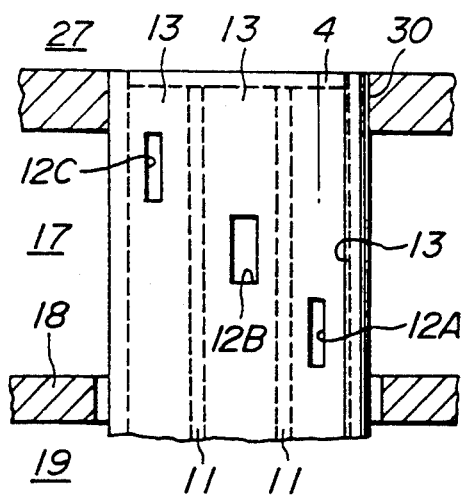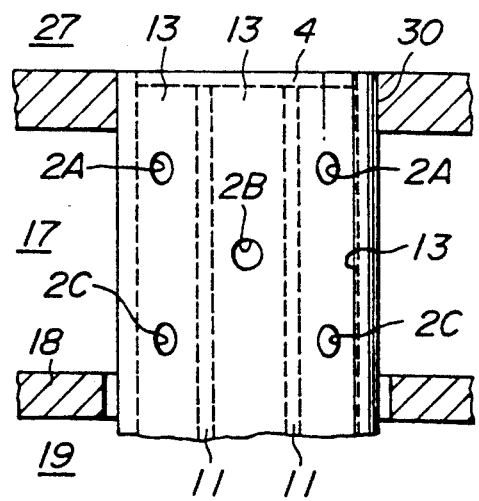

SOLID OXIDE FUEL CELLS

BACKGROUND OF THE INVENTION

1. Field of the Invention

This invention relates to a solid oxide fuel cell.

2. Related Art Statement

Recently, fuel cells have been noted as useful as power generating equipment. The fuel cell is a device capable of directly converting chemical energy possessed by fuel to electrical energy. Since the fuel cell is free from the limitation of Carnot's cycle, it is an extremely promising technique in that the fuel cell essentially has a high energy conversion efficiency, and various fuels (naphtha, natural gas, methanol, coal reformed gas, heavy oil, etc.) may be used. Moreover, the public nuisance is less, and the power generating efficiency is not influenced by the scale of the equipment.

Particularly, since the solid oxide fuel cell (hereinafter abbreviated as SOFC) operates at a high temperature of 1000° C. or more, the activity of the electrode is very high, and the use of a noble metal catalyst such as expensive platinum is not completely required. In addition, since the SOFC has a low polarization and a relatively high output voltage, the energy conversion efficiency is considerably higher than that in the other fuel cells. Furthermore, since the SOFC is constructed with solid materials, it is stable and has a long use life.

FIG. 6 sectionally shows an example of this type of SOFC.

In FIG. 6, numeral 10 is a supply tube for introducing an oxidizing gas such as air or the like, numeral 6 is a bottomed cylindrical porous support numeral 7 is an air electrode, numeral 8 is a solid electrolyte, numeral 9 is a fuel electrode, numeral 16 is an upper plate supporting the oxidizing gas supply tube 10 and dividing an oxidizing gas chamber 27 and an exhaust gas chamber 17, numeral 20 is a bottom plate supporting an SOFC body 5 and provided with a fuel hole 20a communicating a cell reaction chamber 19 to a fuel chamber 26, numeral 18 is a plate holding an outer periphery of an opening side of the SOFC body 5 and provided with a gas hole 18a communicating the cell reaction chamber 19 to the exhaust gas chamber 17.

When the oxidizing gas such as air or the like is supplied from the oxidizing gas chamber 27 to the oxidizing gas supply tube 10 as shown by an arrow A, it is discharged from an outlet port 10a for the oxidizing gas and turned at the bottomed portion inside the SOFC body 5 as shown by an arrow B to flow out into the exhaust gas chamber 17 as shown by an arrow C. On the other hand, a fuel gas such as $H_2$, $CH_4$ or the like is flown through the fuel hole 20a of the bottom plate 20 along an outer surface of the SOFC body 5 as shown by an arrow D. In this way, oxygen inside the SOFC body 5 flows as an oxygen ion through the solid electrolyte 8 to the fuel electrode 9 and reacts with the fuel gas at the fuel electrode 9 to generate a current between the air electrode 7 and the fuel electrode 9, whereby the cell can be used as a fuel cell. Since the fuel cell is used at a high temperature of about 1000° C., the shape of FIG. 6 is capable of being constructed without a seal portion and is said to be preferable because the occurrence of thermal stress can be reduced.

In the SOFC of the above structure, however, the oxidizing gas supply tube 10 and the SOFC body 5 are separately made and the holding of the supply tube 10 is attained only by engaging with the upper plate 16, so that there is caused a problem that the positioning of the supply tube 10 in the SOFC body 5 becomes difficult.

Furthermore, since the position of the supply tube 10 to the SOFC body 5 changes due to the difficulty of the positioning, when the oxidizing gas such as air or the like is supplied through the supply tube 10 and turned at the bottomed portion inside the SOFC body 5 to rise upward between the outer surface of the supply tube 10 and the inner surface of the SOFC body 5, the flowing of the oxidizing gas changes in accordance with the position of the supply tube 10 in the SOFC body 5, so that there is a problem of inconsistent performance among different cells.

Moreover, there is caused a problem that the mechanical strength against vibrations or the like in the mounting or during use are insufficient because the supply tube 10 and the SOFC body 5 are separately made as mentioned above.

SUMMARY OF THE INVENTION

It is, therefore, an object of the invention to provide a solid oxide fuel cell which can accurately determine the positioning of the supply tube for oxidizing gas or fuel gas inside the SOFC body and has sufficient mechanical strength and fixing strength against vibrations or the like in the mounting or during use.

According to the invention, there is the provision of a solid oxide fuel cell comprising:

a bottomed cylindrical solid oxide fuel cell body at least provided with a solid electrolyte, an air electrode and a fuel electrode;

a gas supply tube for supplying an oxidizing gas or a fuel gas to a hollow space of the solid oxide fuel cell body;

partition members arranged between an inner peripheral surface of the solid oxide fuel cell body and an outer peripheral surface of the gas supply tube and dividing the hollow space of the solid oxide fuel cell body into a plurality of gas flowing passages;

a sealing member closing an opening end of the solid oxide fuel cell body;

at least one exhaust port formed in each of the gas flowing passages for discharging the oxidizing gas or fuel gas flowing in the gas flowing passages to an exhaust gas chamber; and a support means for holding an outer peripheral surface at the opening end side of the solid oxide fuel cell body.

BRIEF DESCRIPTION OF THE DRAWINGS

The invention will be described with reference to the accompanying drawings, wherein:

FIG. 1 is a longitudinal sectional view of an embodiment of the SOFC according to the invention;

FIG. 2 is a sectional view taken along a line II—II of FIG. 1;

FIGS. 3 and 4 are sectional views of main parts of other embodiments of the SOFC according to the invention;

DESCRIPTION OF THE PREFERRED EMBODIMENTS

Figure 6:
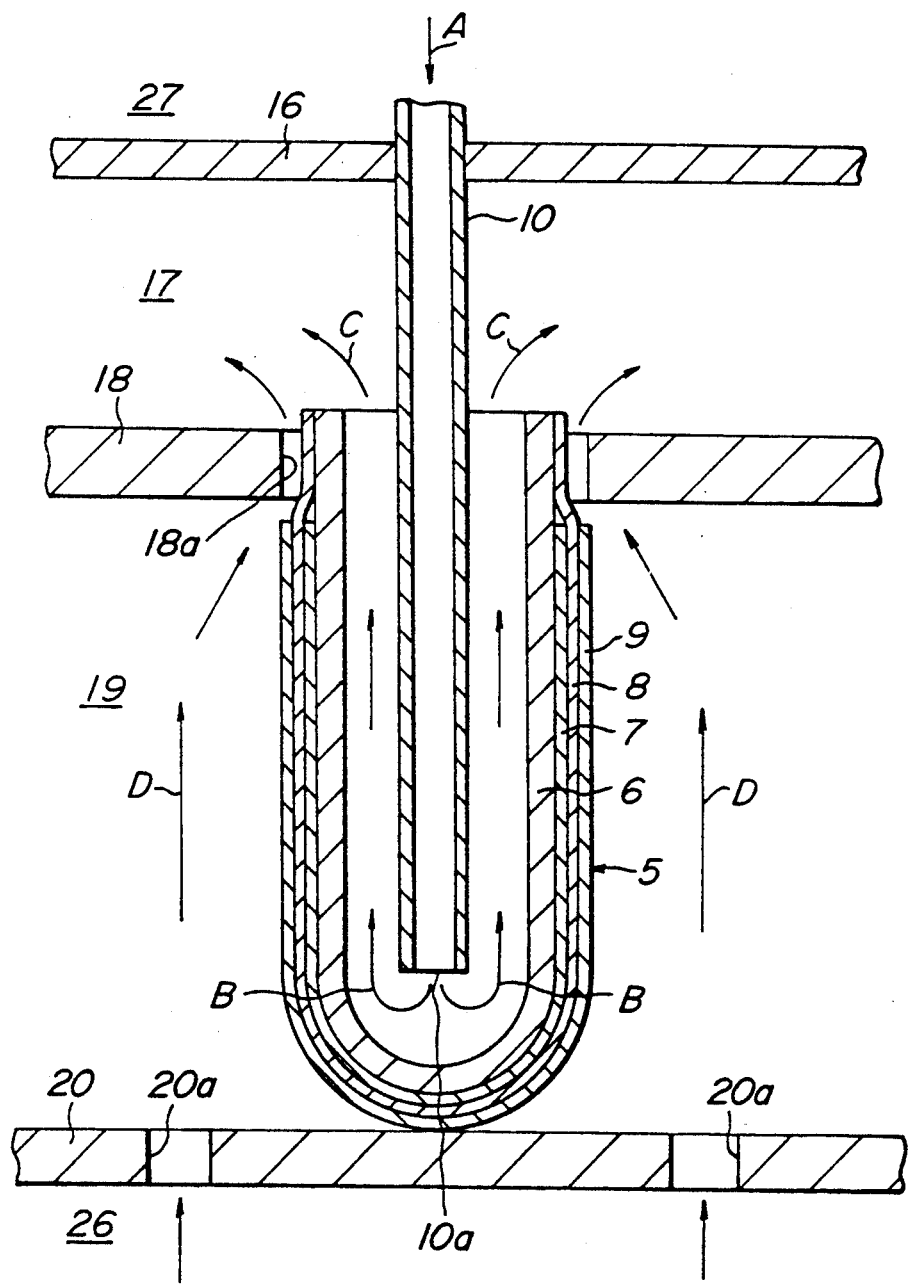
FIG. 6 is a longitudinally sectional view of a conventional SOFC.

In FIG. 1 is sectionally shown a first embodiment of the SOFC according to the invention, and FIG. 2 is a sectional view taken along a line II—II of FIG. 1. FIG. 1 corresponds to a section taken along a line I—I of FIG. 2. In the illustrated SOFC, the same function part as in FIG. 6 is represented by the same numeral.

In this embodiment, a bottomed cylindrical porous support tube 6 and a solid electrolyte 8 in an SOFC body 15 are extended upward in the drawing and an outer peripheral surface 30 of the SOFC body 15 at its opening end side is rigidly held by and fixed to an upper plate 16. In a hollow space of the SOFC body 15, three flat plate partition members 1A, 1B, 1C are radially arranged from the outer peripheral surface of the oxidizing gas supply tube 10 toward the inner peripheral surface of the SOFC body 15 as shown in FIG. 2, whereby the hollow space is divided into three oxidizing gas flowing passages 3A, 3B, 3C. At the opening end of the SOFC body 15, a ring-like sealing member 4 is arranged between the gas supply tube 10 and the bottomed cylindrical porous support tube 6 to prevent discharge of the oxidizing gas from the gas flowing passages 3A, 3B, 3C to an exhaust gas chamber 17. In the oxidizing gas flowing passages 3A, 3B, 3C are arranged exhaust ports 2A, 2B, 2C for the oxidizing gas facing the exhaust gas chamber 17, respectively. In this case, the height levels of these exhaust ports 2A, 2B, 2C are made different in up and down directions in such a manner that two or more adjacent exhaust ports are not existent on the same cut plane when the SOFC body 15 is horizontally cut in the lateral direction.

In the operation of the SOFC, the oxidizing gas is supplied from a supply port 10a of the oxidizing gas supply tube 10 to the hollow space of the SOFC body 15 and discharged from the exhaust ports 2A, 2B, 2C through the gas flowing passages 3A, 3B, 3C to the inside of the exhaust gas chamber 17 as shown by an arrow F.

The air electrode 7 may be made from doped or undoped $LaMnO_3$, $CaMnO_3$, $LaNiO_3$, $LaCoO_3$, $LaCrO_3$ or the like, among which $LaMnO_3$ doped with strontium is preferable. The solid electrolyte 8 may generally be made from zirconia stabilized with yttria or the like. The fuel electrode 9 is generally made from nickel-zirconia cermet or cobalt-zirconia cermet.

The SOFC of the above embodiment develops the following effects:

(1) In the conventional SOFC having the structure shown in FIG. 6, the oxidizing gas supply tube 10 and the SOFC body 5 are separately made, so that it is difficult to accurately position the supply tube 10 in the hollow space of the SOFC body. As a result, the position of the supply tube 10 in the hollow space changes and hence the flowing of the oxidizing gas rising between the outer peripheral surface of the supply tube 10 and the inner peripheral surface of the bottomed cylindrical porous support tube 6 changes, so that there is caused a problem of inconsistent performance among different cells.

On the contrary, in the above embodiment, the oxidizing gas supply tube 10 is connected to the SOFC body 15 through the flat plate partition members 1A, 1B, 1C, so that the supply tube 10 can surely be positioned in the hollow space, and consequently there is caused no scattering of performances due to the relative position change between the supply tube 10 and the SOFC body 15. Furthermore, three flat plate partition members 1A, 1B, 1C are radially extended from the supply tube 10, so that the mechanical strengths of the SOFC body 15 considerably increases in view of structural dynamics.

(2) Since the outer peripheral surface 30 of the SOFC body 15 at its opening end side is held by and fixed to the upper plate 16, the SOFC body 15 itself can rigidly be held. Further, the supply tube 10 is held and fastened to the SOFC body 15 through the flat plate partition members 1A, 1B, 1C. Therefore, the fixing strength of the SOFC body 15 is sufficiently high.

(3) The closing member 4 is arranged on the opening end of the SOFC body 15 and acts as a sealing means for the flow of the oxidizing gas, so that the mechanical strength of the opening portion of the SOFC body 15, particularly strength in radial direction thereof is considerably increased, whereby the outer peripheral surface 30 of the opening portion in the SOFC body can strongly be held. As a result, the fixing strength of the SOFC body 15 is increased even more.

(4) The exhaust ports 2A, 2B, 2C for the oxidizing gas are arranged in the respective oxidizing gas flowing passages 3A, 3B, 3C and the oxidizing gas having a reduced concentration is discharged from each of the exhaust ports, so that the flowing of the oxidizing gas is not stopped even in any one of the oxidizing gas flowing passages and a fresh oxidizing gas is always passed through the hollow space. As a result, full areas of the air electrode and fuel electrode can effectively be utilized in power generation, whereby the power generation efficiency can be improved.

(5) When the exhaust ports for the oxidizing gas are disposed in the side face of the SOFC body, the strength in the portion having the exhaust port lowers and hence the SOFC body 15 is apt to be bent around the exhaust port. If the exhaust ports 2A, 2B, 2C of the respective oxidizing gas flowing passages 3A, 3B, 3C are arranged at the same height level or so as to exist two or three exhaust ports at the same cut plane when the SOFC body 15 is horizontally cut in the lateral direction, the bending strength of the SOFC body 15 locally and largely decreases at this height level and consequently the SOFC body 15 is easily bent.

On the contrary, in the SOFC of the above embodiment, the heights of the exhaust ports 2A, 2B, 2C for the oxidizing gas are arranged at different levels and do not adjacently exist at the same level, so that the bending strength does not locally lower.

FIGS. 3 and 4 are partial sectional views of other embodiments illustrating the portion of the SOFC near the opening end side, respectively.

In the SOFC of FIG. 3, six flat plate partition members 11 are radially arranged in the hollow space of the SOFC body between the outer periphery of the oxidizing gas supply tube and the inner periphery of the SOFC body to divide the hollow space into six oxidizing gas flowing passages 13. Furthermore, each of rectangular slit-like exhaust ports 12A, 12B, 12C for the oxidizing gas is arranged for each of the respective oxidizing gas flowing passages 13 (the same exhaust ports are arranged at a side not shown). In this case, the heights of these exhaust ports are changed between the adjoining oxidizing gas flowing passages 13, whereby these exhaust ports for the adjoining oxidizing gas flowing passages 13 are not existent on the same cut plane when the SOFC body is horizontally cut in the lateral direction. Thus, the bending strength of the SOFC body is maintained in the lateral direction at the exhaust port for the oxidizing gas exhibiting a locally weak structural strength.

The SOFC of FIG. 4 is a modified embodiment of the SOFC shown in FIG. 3, in which the oxidizing gas flowing passage 13 provided with two exhaust ports 2A, 2C and the oxidizing gas flowing passage 13 provided with an exhaust port 2B are alternately arranged in the circumferential direction of the SOFC body so as to position the height of the exhaust port 2B between the heights of the exhaust ports 2A and 2C.

Figure 5:
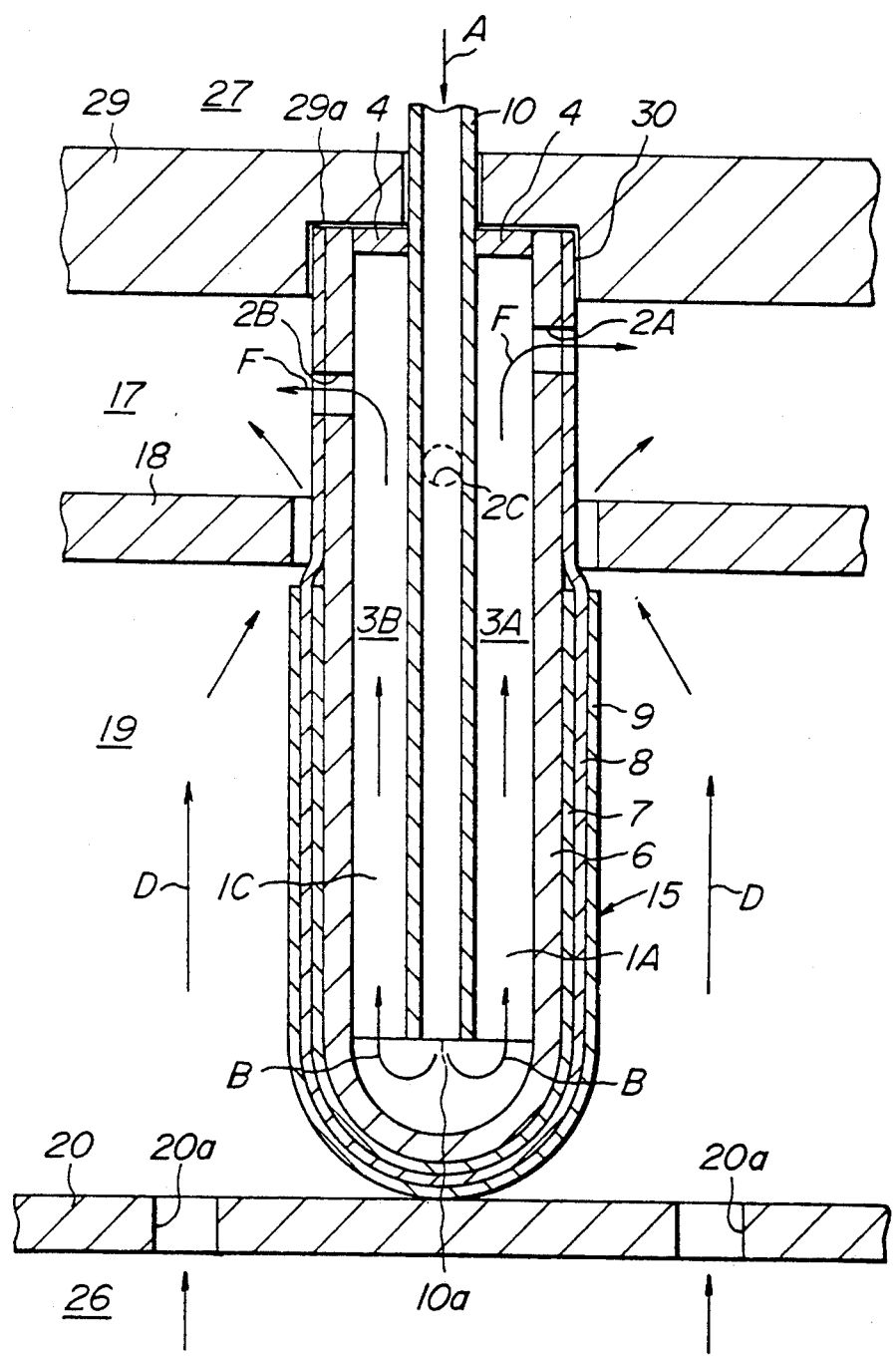
FIG. 5 is a longitudinal sectional view of other embodiment of SOFC according to the invention.

FIG. 5 shows the other embodiment of the SOFC according to the invention, which is a modified embodiment of FIG. 1.

In this embodiment, a disc-like depression 29a is formed in an upper plate 29, and the upper part of the SOFC body 15 is inserted into the depression 29a, whereby the outer peripheral surface 30 of the SOFC body 15 is held by and fixed to the upper plate 29. Further, the exhaust ports 2A, 2B, 2C for the oxidizing gas are arranged in the respective oxidizing gas flowing passages 3A, 3B, 3C to conduct the discharge of the oxidizing gas having a reduced concentration likewise FIG. 1. Moreover, the leakage of the oxidizing gas passing upward in each of the oxidizing gas flowing passages 3A, 3B, 3C is prevented by the closing member 4.

It is possible to omit the use of the closing member 4. In this case, the oxidizing gas having a reduced concentration is sealed by the wall face of the depression 29a.

Moreover, the above-mentioned embodiments may be changed or modified in various fashions.

Although the aforementioned embodiments are described with respect to the so-called single cell type bottomed cylindrical SOFC, the invention is naturally applicable to the so-called multi-cell type SOFC.

In the above embodiments, the fuel electrode 9 is arranged outside the air electrode 7, but such an electrode arrangement may be reversed. In the latter case, the fuel gas is supplied to the hollow space of the SOFC body, while the oxidizing gas is supplied to the outside of the SOFC body.

The number of flat plate partition members dividing the hollow space or the number of the gas flowing passages may be varied. For example, the number of the flat plate partition members may be about 12. Even when the number of the flat plate partition members increases, the loss of the hollow space can be reduced by thinning the thickness of each of the partition members. Moreover, the partition member dividing the hollow space may take various shapes such as wavy form in section and the like in addition to the flat plate.

In the aforementioned embodiments, unit cell is formed on the bottomed cylindrical porous body, but the cell body may be made self-dependent by constructing the air electrode with a rigid body.

Furthermore, only the hollow space between the gas supply tube 10 and the bottomed cylindrical porous support tube 6 is divided by the flat plate partition members 1A, 1B, 1C, but the inside of the supply tube 10 can be divided by extending these partition members to the center of the supply tube.

Thus, when a thin film is partly formed on the surface of the bottomed cylindrical porous support tube by vapor deposition reaction as in interconnector for fuel cell, the local formation of thin film is made possible by flowing reaction gas through a space corresponding to the film-forming portion, and consequently the masking conventionally used can be omitted.

In the solid oxide fuel cell according to the invention, the partition member is fastened between the inner peripheral surface of the solid oxide fuel cell body and the outer peripheral surface of the gas supply tube, so that the gas supply tube can surely be positioned in the hollow space of the fuel cell body, whereby the scattering of power generation performances in the SOFC body due to the relative position change between the gas supply tube and the SOFC body can be eliminated and the mechanical strengths of the SOFC body can be increased considerably.

Furthermore, the outer peripheral surface of the SOFC body at its opening end side is fixed to the upper plate, so that the SOFC body itself can rigidly be held and hence the gas supply tube is held by and fixed to the SOFC body through the partition members.

Moreover, the opening end of the SOFC body is sealed by the closing member and at least one exhaust port is arranged in each of the gas flowing passages for discharging a gas having a reduced concentration to the exhaust gas chamber, so that the gas having the reduced concentration is not retained in all of the gas flowing passages and a fresh gas is always passed through the hollow space, and consequently the full areas of the air electrode and the fuel electrode can effectively be utilized for power generation to improve the power generation efficiency.

What is claimed is:
1. A solid oxide fuel cell comprising:
   a cylindrical solid oxide fuel cell body having an open end and an opposed, closed end and at least provided with a solid electrolyte, an air electrode and a fuel electrode;
   a gas supply tube for supplying an oxidizing gas or a fuel gas to a hollow space of the solid oxide fuel cell body;
   partition members arranged between an inner peripheral surface of the solid oxide fuel cell body and an outer peripheral surface of the gas supply tube and dividing the hollow space of the solid oxide fuel cell body into a plurality of gas flowing passages;
   a sealing member closing said open end of the solid oxide fuel cell body;
   at least one exhaust port formed in each of the gas flowing passages for discharging the oxidizing gas or fuel gas flowing in the gas flowing passages to an exhaust gas chamber; and
   support means for holding an outer peripheral surface of the solid oxide fuel cell at said open end thereof.

2. The solid oxide fuel cell according to claim 1, wherein said exhaust ports formed in said gas flowing passages have different height levels so as not to be existent at the same cut plane when said fuel cell body is horizontally cut in a lateral direction thereof.

3. The solid oxide fuel cell according to claim 1, wherein said air electrode comprises doped or undoped $LaMnO_3$, $CaMnO_3$, $LaNiO_3$, $LaCoO_3$ or $LaCrO_3$.

4. The solid oxide fuel cell according to claim 3, wherein said air electrode comprises $LaMnO_3$ doped with strontium.

5. The solid oxide fuel cell according to claim 1, wherein said solid electrolyte comprises zirconia stabilized with yttria.

6. The solid oxide fuel cell according to claim 1, wherein said fuel electrode comprises nickel-zirconia cermet or cobalt-zirconia cermet.

7. A solid oxide fuel cell comprising:

a cylindrical solid oxide fuel cell body having an open end and an opposed, closed end and at least provided with a solid electrolyte, an air electrode and a fuel electrode;

a gas supply tube for supplying an oxidizing gas or a fuel gas to a hollow space of the solid oxide fuel cell body;

partition members arranged between an inner peripheral surface of the solid oxide fuel cell body and an outer peripheral surface of the gas supply tube and dividing the hollow space of the solid oxide fuel cell body into a plurality of gas flowing passages;

a sealing member closing said open end of the solid oxide fuel cell body;

at least one exhaust port formed in each of the gas flowing passages at a position between the closed end of the solid-oxide fuel body and the support means, said at least one exhaust port discharging the oxidizing gas or fuel gas flowing in the gas-flowing passages to an exhaust gas chamber.

8. The solid-oxide fuel cell of claim 7, wherein a portion of the length of the solid-oxide fuel cell body has no electrodes, and that portion includes a region of contact between the support means and said outer peripheral surface of the solid-oxide fuel cell body, and further includes a portion of the solid-oxide fuel cell body through which said exhaust ports extend.

* * * * *